US006792531B2

(12) United States Patent
Heiden et al.

(10) Patent No.: US 6,792,531 B2
(45) Date of Patent: Sep. 14, 2004

(54) METHOD AND SYSTEM FOR REVOCATION OF CERTIFICATES USED TO CERTIFY PUBLIC KEY USERS

(75) Inventors: Richard W. Heiden, Huntington, CT (US); Monroe A. Weiant, Jr., Trumbull, CT (US)

(73) Assignee: Pitney Bowes Inc., Stamford, CT (US)

( * ) Notice: Subject to any disclaimer, the term of this patent is extended or adjusted under 35 U.S.C. 154(b) by 275 days.

(21) Appl. No.: 10/036,911

(22) Filed: Dec. 21, 2001

(65) Prior Publication Data

US 2002/0056050 A1 May 9, 2002

Related U.S. Application Data

(63) Continuation-in-part of application No. 09/698,420, filed on Oct. 27, 2000.

(51) Int. Cl.[7] .................................................. H04L 9/00
(52) U.S. Cl. ........................ 713/158; 713/156; 713/186; 713/175; 705/76; 705/65; 380/30
(58) Field of Search .................................. 713/158, 156, 713/157, 200, 201, 186, 173; 380/30; 705/76, 44, 65, 75

(56) References Cited

U.S. PATENT DOCUMENTS

| | | | |
|---|---|---|---|
| 4,024,380 A | | 5/1977 | Gunn |
| 5,097,528 A | | 3/1992 | Gursahaney et al. |
| 5,261,002 A | * | 11/1993 | Perlman et al. ................ 380/30 |
| 5,265,145 A | | 11/1993 | Lim |
| 5,311,577 A | | 5/1994 | Madrid et al. |
| 5,333,152 A | | 7/1994 | Wilber |
| 5,341,414 A | | 8/1994 | Popke |
| 5,343,516 A | | 8/1994 | Callele et al. |
| 5,394,461 A | | 2/1995 | Garland |
| 5,467,385 A | | 11/1995 | Reuben et al. |
| 5,506,897 A | | 4/1996 | Moore et al. |
| 5,677,955 A | * | 10/1997 | Doggett et al. ............... 705/76 |
| 5,745,574 A | * | 4/1998 | Muftic ........................ 713/157 |
| 5,799,086 A | | 8/1998 | Sudia |
| 5,884,158 A | | 3/1999 | Ryan, Jr. et al. |
| 5,943,658 A | | 8/1999 | Gravell et al. |
| 6,049,594 A | * | 4/2000 | Furman et al. ............. 379/67.1 |
| 6,098,056 A | | 8/2000 | Rusnak et al. |
| 6,167,518 A | * | 12/2000 | Padgett et al. ............... 713/186 |
| 6,233,565 B1 | | 5/2001 | Lewis et al. |
| 6,324,271 B1 | | 11/2001 | Sawyer et al. |
| 6,324,645 B1 | * | 11/2001 | Andrews et al. ............. 713/157 |
| 6,327,578 B1 | * | 12/2001 | Linehan ........................ 705/65 |
| 6,438,690 B1 | * | 8/2002 | Patel et al. .................. 713/156 |
| 6,463,534 B1 | | 10/2002 | Geiger et al. |
| 6,564,320 B1 | * | 5/2003 | de Silva et al. ............. 713/156 |
| 6,615,347 B1 | * | 9/2003 | de Silva et al. ............. 713/156 |

FOREIGN PATENT DOCUMENTS

EP          0665517 A2      8/1995

* cited by examiner

*Primary Examiner*—Ly V. Hua
(74) *Attorney, Agent, or Firm*—Brian A. Lemm; Angelo N. Chaclas

(57) ABSTRACT

A method and system for creating, reviewing and revoking, if necessary, a certificate for a client of a service provider of a communications network, wherein the client has a client private key and a client public key. The method includes the steps of establishing a communications link with the service provider through a dedicated communication channel; requesting a client certificate from the service provider; obtaining a caller-ID, including a telephone number from an operator of the dedicated communication channel; and creating the requested client certificate including the caller-ID. Preferably, the method also includes the step of verifying that the caller-ID obtained from the operator of the dedicated communication channel is the same as client identifying information provided by the client when requesting the client certificate. The certificate can be stored at a caller ID server or a client's storage. The method includes the steps of periodically reviewing issued certificates against a reverse telephone book to determine if the included telephone number is still associated with the client and revoking the certificate if it is not.

28 Claims, 4 Drawing Sheets

METHOD AND SYSTEM FOR REVOCATION OF CERTIFICATES USED TO CERTIFY PUBLIC KEY USERS

RELATED APPLICATIONS

The present application is a continuation-in-part of U.S. patent application Ser. No. 09/698,420.

BACKGROUND OF THE INVENTION

The present invention is related generally to the authentication of a client of an Internet Service provider (ISP) in on-line applications, and particularly to the revocation of certificates issued to such clients.

In on-line applications that use a communication network, such as the Internet or an Internet-like network, it is currently impossible to send caller ID information forward from the service provider with which the client is connected. For example, if a client requests a service or wishes to make a purchase from a supplier through the Internet, it is currently almost impossible to authenticate the client's identity through the Internet.

Presently, it is possible to authenticate an individual by means of certificates. A certificate is an electronic document used to identify an individual, a company or some other entity and to associate that identity with a public key. The certificate, which can be issued by a Certificate Authority (CA), binds a particular public key to the name of the entity that the certificate identifies. For that purpose, the certificate always includes the name of the entity, the entity's public key and a digital signature of the issuing CA. As it is well known in the art, a digital signature is a digital signed message. The message serves as a "letter of introduction" for the recipients who know and trust the CA but do not know the entity identified by the certificate. In this case, the message is first converted into a digest by a one-way hash function, and the digest is encrypted with the CA's private key into a digital signature. The digital signature is sent to the message recipient along with a CA's public key certificate and a copy of the original message. In operation, when the CA sends a signed message with a certificate attached thereto, the recipient verifies the authenticity of the certificate by using the CA's public key. The recipient also generates a digest of the message sent using the same one-way hash function and compares this digest with the digital signature decrypted using the CA's public key for an exact match. With this method, the identity of an entity can be authenticated by a certificate.

However, before issuing a certificate, the CA must use its published verification procedures for that type of certificate to ensure that an entity requesting a certificate is, in fact, who it claims to be. Currently, there are a number of ways to obtain public key certificates. Some of these are relatively simple while others can consume a great deal of time with their requirements. Certificates that are easy to get of course have more risk associated with their use as compared to certificates created with greater care. In each case, the risk involved relates to the level of trust associated with the usage of the certificate. The more effort put into the identification of the certificate owner, the more trust there is in the digital signatures generated from the certificate's associated private key. The level of trust is based on the published Certificate Practice Statement (CPS) that the certificate issuer adheres to when creating a certificate. In the case of this invention, the CPS defines the steps that are performed when using a caller-id capability in the creation of the certificate. Included in the certificate is a reference to the applicable CPS. The Internet Engineering Task Force (IETF) Public Key Infrastructure (PKIX) working group has defined standards for certificate management. Specifically, the most common of these standards is referred to as X.509. Other certificate standards include Simple Public Key Infrastructure (SPKI) and Pretty Good Privacy (PGP). The X.509 certificate includes the following information: version, serial number, signature, algorithm identifier, issuer name, validity period, subject name, issuer and authorization attributes. Such certificates are well known to those skilled in the art.

The above mentioned U.S. patent application Ser. No. 09/698,420 discloses a method and system for more easily issuing a certificate with a high level of trustworthiness. By using the caller-id feature associated with the use of private, or dedicated, communication connections—land based telephone line, Digital Subscriber Line (DSL), etc.—it is possible to create a certificate that is easy for the client to obtain and yet can be used to authenticate a client's identity with a high-degree of confidence.

A related problem for CA's is certificate revocation. Certificate revocation is a daunting task. It requires that some entity maintain a list or real time system of information about the validity of certificates. This is a costly process.

Thus it is an object of the present invention to provide a method and system for providing trustworthy certificates which can be easily issued and easily reviewed for possible revocation.

BRIEF SUMMARY OF THE INVENTION

The above object is achieved and the disadvantages of the prior art are overcome in accordance with the present invention by means of a method, and a programmable server programmed to carry out such method, where including the steps of: a) selecting a class of certificates for review, each of the certificates including identifying information and a phone number for its owner; b) choosing a next certificate from the class for review; c) accessing a reverse telephone database to determine if the next certificate's identifying information is still correct; and if not, d) adding the next certificate to a list of revoked certificates; and e) if more certificates in the group remain to be reviewed, returning to step b.

In accordance with one aspect of the present invention the identifying information includes an address for its owner, and the method includes the further steps of accessing an address database to further verify that the address is still correct and, if not, adding the certificate to the list of revoked certificates.

In accordance with another aspect of the present invention the method includes the further steps of accessing a plurality of reverse directories or a plurality of address databases and using a predetermined scoring algorithm to determine if the certificate is added to the list of revoked certificates.

In accordance with still another aspect of the present invention the method includes: a) receiving a request for a certificate on a dedicated communications channel; b) requesting caller identifying information for the request from an operator of the dedicated channel; c) creating the requested certificate using the caller identifying information, the certificate including at least an owner's phone number determined from the identifying information; and thereafter d) selecting a class of certificates previously created in steps a through c for review; e) choosing a next certificate from the group for review; f) accessing a reverse telephone book database to determine if the next certificate's identifying information and phone number are still correct; and if not, g) adding the next certificate to a list of revoked certificates; and k) if more certificates in the group remain to be reviewed, returning to step e.

Other objects and advantages of the present invention will be apparent to those skilled in the art from consideration of the detailed description set forth below and the attached drawings.

DETAILED DESCRIPTION OF PREFERRED EMBODIMENTS OF THE INVENTION

Figure 1:
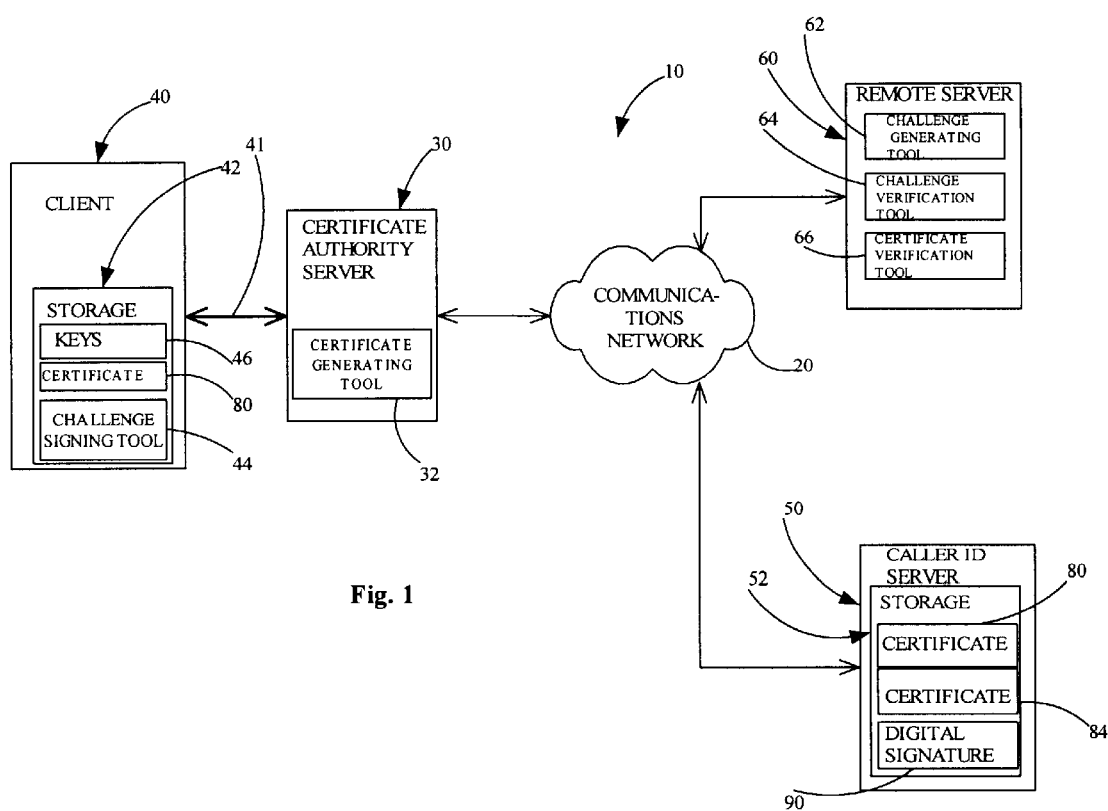
FIG. 1 shows a schematic block diagram of a system for authenticating a client requesting certification.
Figure 2:
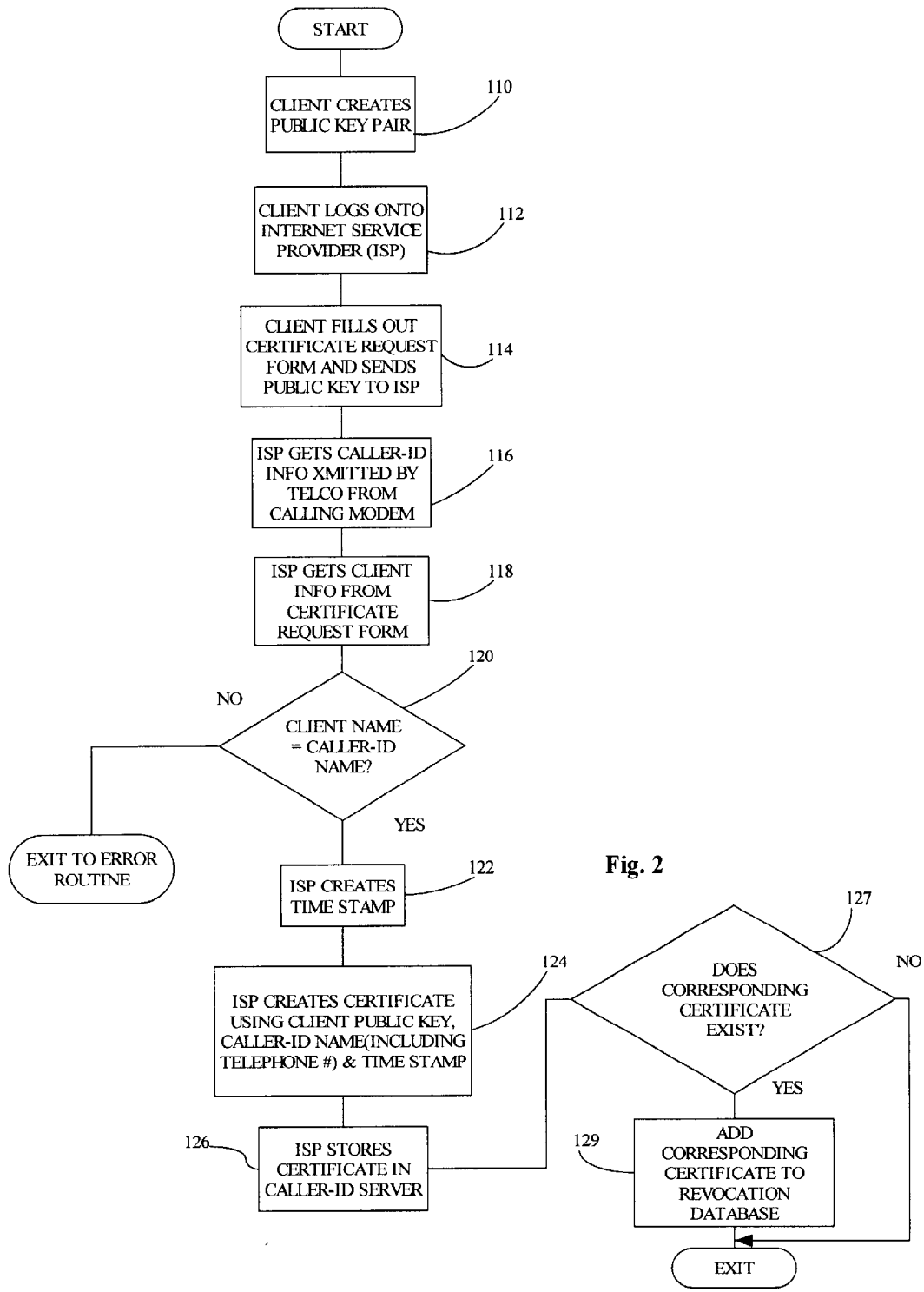
FIG. 2 shows a flow diagram of a method for creating a certificate for a client.

FIG. 1 illustrates a caller ID authentication system 10. As shown, the system 10 has a communications network 20, which can be the Internet, or the like. A certificate authority server 30, which can be a server for a service provider, such as an Internet Service Provider (ISP), includes a data processor and communications ports for providing links to various devices, either directly or through a network such as the Internet. Server 30 is connected to the communications network 20 and to client 40 to provide communications-related services to client 40. The certificate authority server 30 can be an Internet Service Provider (ISP), or a telephone service company. Client 40 is broadly defined as a user who uses the network 20 or a device to allow the user to access the network 20. Thus, client 40 can be a personal computer (PC), a land-line telephone, a dedicated communications line (such as a DSL line), a wireless telephone or another portable communication device. Connection 41 between the certificate authority server 30 and client 40 is a dedicated (for the call duration) link such as a telephone connection having a caller-ID or similar facility, and can be a land-line or a wireless channel, as can the connection between the certificate authority server 30 and the network 20. (Caller-ID functions are well known and need not be described further here for an understanding of the present invention.) Client 40 is capable of providing a key pair 46, which includes a private key and a public key to be stored in a storage area 42. Furthermore, client 40 has a challenge-signing tool 44 to allow client 40 to sign a challenge. The certificate authority server 30 is capable of collecting client (hereinafter sometimes "caller") identifying information and signing the identifying information into a certificate using a certificate generating tool 32. Also connected to the communications network 20 are a remote server 60, which has a tool 62 for generating challenges and sending the challenges to client 40 for authentication purposes, and a caller-ID server 50, which has a storage 52 for storing certificates provided by the certificate authority server 30 or client 40. The remote server 60 also has a challenge-verification tool 64 and a certificate verification tool 66. Typically remote server 60 is used for the sale of goods or services, or to provide access to valuable information, or to provide a secure communications link, or to provide any other service requiring a degree of assurance as to the identity of a client. If client 40 wishes to purchase an item through the network 20, usually he or she must provide identification. In accordance with the present invention, if, for example, client 40 uses a telephone to access the network 20 the calling telephone number is provided by the network caller-ID facility and can serve as identification. In general client 40 provides some additional identifying information, which may include a name, the client public key, or a telephone number to the certificate authority server 30, as a form of caller identification As shown in FIG. 2, client 40 creates a key pair 46 including a private key and a public key, at step 110. Client 40 logs into the certificate authority server 30 at step 112, via a dedicated channel or a wireless connection having caller-ID or similar facility. If feasible, an SSL session from a browser could also be used as a secure connection between the client and server 30. At step 114 client 40 fills out a certificate request form to provide client information to the certificate authority server 30. At step 116, the certificate authority server 30 collects the client's caller-ID transmitted by a telephone company from the modem. In this case, the telephone company provides the physical connection between the certificate authority server 30 and client 40. In some cases, certificate authority server 30 is the telephone company. At step 118, certificate authority server 30 obtains identifying information from the certificate request form. At step 120, certificate authority server 30 checks the client's name against the caller-ID name. If they are the same, then the process will continue at step 122. Otherwise, the process exits to an error routine, details of which form no part of the present invention. At step 122, certificate authority server 30 creates a time-stamp indicative of the time at which the identifying information is collected, and subsequently, a certificate 80 is created using client public key, caller-ID (which includes the calling telephone number) and the time-stamp, at step 124. In some cases, all of the caller-ID information (name and telephone number) is included in the certificate 80. In the case where the caller's name is not provided as part of the caller-ID, the name will be looked up in a database that uses the caller's number as its primary key. From the received information, the certificate authority server 30 uses the tool 32 to sign identifying information with a certified key set into a provider's digital signature, and stores a certificate 80 (the provider's digital signature and the identifying information) to the caller ID server 50 at step 126. Optionally, certificate 80 can be given to client 40 to be stored in the storage 42 so that client 40 can provide certificate 80 to the remote server 60 upon request or can be provided to server 60. It will be understood that certificate 80 may be returned to client 40 in an e-mail message. The signing process can be performed by certificate authority server 30 or by the telephone company.

At step 127 server 30 determines if a corresponding certificate having substantially the same identifying information exists and, if so, at step 129 enters the corresponding certificate into revocation database 132, substantially as described below.

With certificate 80, client 40 can be authenticated by the remote server 60. For example, client 40 is subjected to authentication regarding a credit card sale. Remote server 60 uses the challenge-generating tool 62 to generate and send a challenge to client 40. The challenge may include a purchase order for the credit card sale. Client 40 uses challenge-signing tool 44 to sign the challenge and sends the signed challenge including the client's digital signature to the remote server 60. Server 60 retrieves certificate 80 from caller ID server 50. Alternatively, remote server 60 retrieves certificate 80 directly from client 40. Server 60 then uses the public key linked to client 40 by certificate 80 to authenticate the identity of client 40 in a known manner details of which form no part of the present invention.

Once certificates are issued, it is necessary that they be periodically reviewed and, if changes in circumstances necessitate, revoked. Particularly, when certification is based upon caller-ID information it is desirable to revoke certificates when the telephone number used in the certificate is no longer associated with the client. Although other reasons exist for revoking a certificate the present invention provides a unique improvement to the revocation process.

Figure 3:
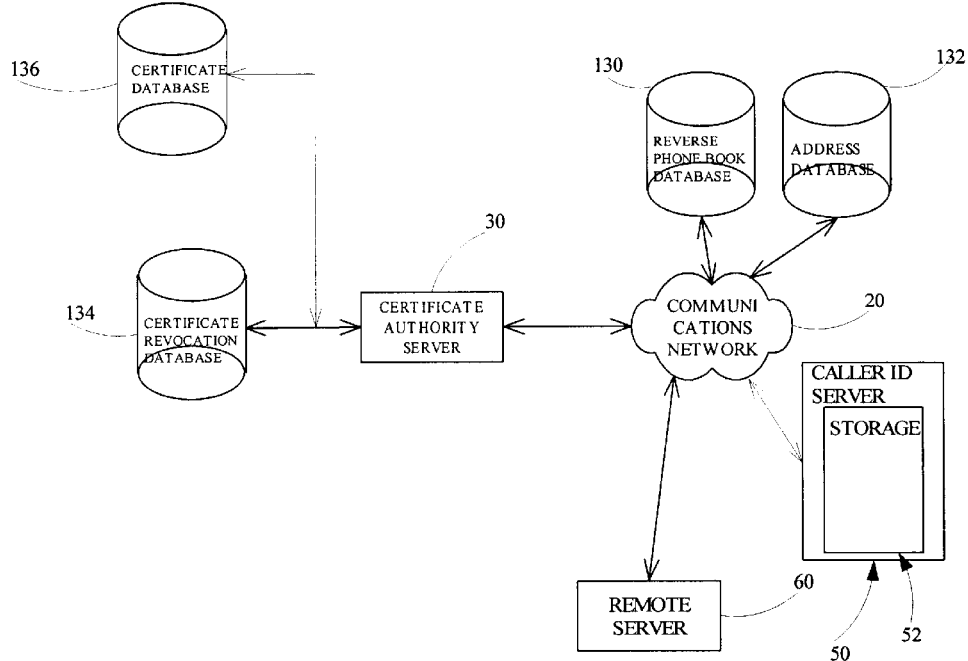
FIG. 3 shows a schematic block diagram of a system for reviewing and revoking, if necessary, issued certificates.

In FIG. 3 Certificate Authority 30 access storage 52 through network 20 and caller-ID server 50 to periodically review and, if necessary revoke, issued certificates. In other embodiments of the present invention, this review and revocation function can be carried out by an entity other than Certificate Authority 30. Authority 30 also accesses reverse phonebook database 130 and address database 132 to determine if the telephone numbers and addresses used in issuing certificates are still associated with the identified clients, as will be described further below. Preferably databases 130 and 132 are maintained by third parties such as telephone companies, Pitney Bowes' ReUnion™ product, and the USPS, and are accessed through network 20. In other embodiments of the present invention these databases can be maintained by authority 30 and accessed directly.

In other embodiments of the present invention, where issued certificates are not centrally stored in caller-ID server 50 but are distributed among remote servers or clients, certificate authority 30 maintains certificate revocation database 134 and certificate database 136 for purposes of review and revocation. In these embodiments remote server 60 would access revocation database 134 through network 20 and certificate authority 30 to determine if a certificate presented had been revoked. To assure the integrity of the certificate revocation database secure methods known to those skilled in the art of public key infrastructures (PKI) will be used to access the certificate revocation database.

Figure 4:
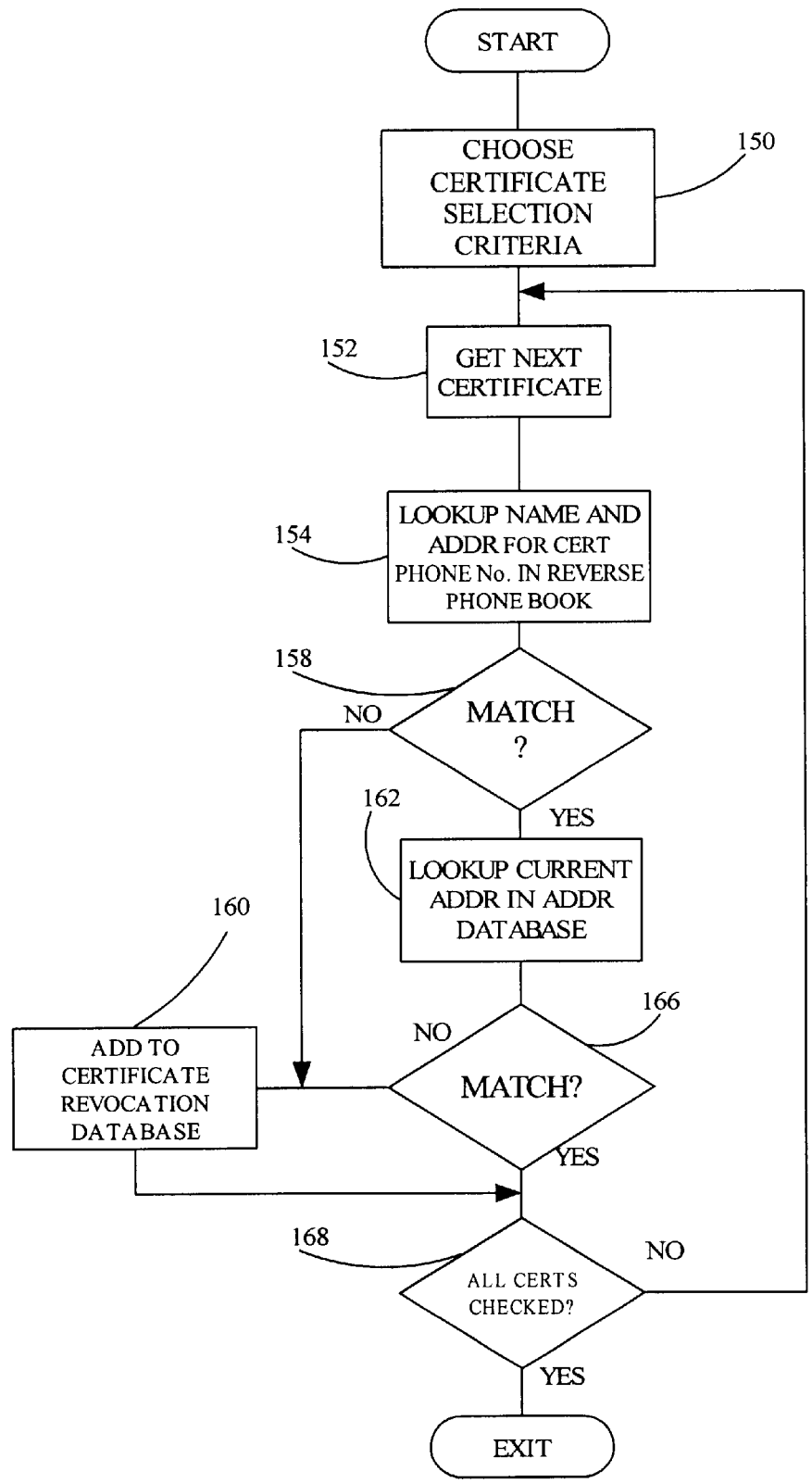
FIG. 4 shows a flow diagram of a method for reviewing issued certificates and revoking such certificates if necessary.

FIG. 4 shows the process of periodic review and revocation of certificates in accordance with the present invention. At step 150, certificate authority 30 chooses predetermined selection criteria for the type of certificate to be reviewed. Such criteria can be periodic, based on the amount of certificate usage, by region or any other criteria that have been found effective for the type of certificate under review.

At step 152 authority 30 gets the next certificate to be reviewed either from caller-ID server 50 or from certificate database 136, if issued certificates are distributed, and at step 154 accesses reverse phonebook database 130 to determine the name and optionally the address associated with the telephone number in the certificate.

At step 158, authority 30 determines if there is a match between the identifying information from the certificate and the corresponding entry in the reverse telephone directory database. If there is no match, i.e. if the name or address differs, or the number is no longer listed, then at step 160 the certificate is revoked by entry into revoked certificate database 134, or by deletion or flagging in caller-ID server 50, if issued certificates are centrally stored. To assure the integrity of certificate revocations other means known to PKI experts can be used to distribute certificate revocations.

At step 162, authority 30 then accesses address database 132 and, at step 166, determines if the client has a new address. If so, at step 160 the certificate is entered into revoked certificate database 136, as described above. Otherwise, at step 168 authority 30 determines if more certificates remain to be reviewed and either exits or returns to step 152 accordingly. Preferably address database 132 is a commercially available database of current addresses such as that provided by the USPS, Pitney Bowes' Reunion™ or marketed by the assignee of the instant application under the trade name "ForwardTrack™".

In another embodiment of the present invention a plurality of reverse phonebook databases or a plurality of address databases can be used with a scoring algorithm to determine if a certificate should be revoked. A scoring algorithm giving proper weight to each source can easily be developed by a person skilled in the art from experience with the reliability of the data from the different sources.

The embodiments described above and illustrated in the attached drawings have been given by way of example and illustration only. From the teachings of the present application those skilled in the art will readily recognize numerous other embodiments in accordance with the present invention.

What is claimed is:

1. A method for revoking certificates comprising:

selecting a class of certificates for review, each of the certificates including identifying information and a phone number for its owner;

choosing a certificate from the selected class for review;

accessing a reverse telephone book database and, using the phone number included in the chosen certificate, obtaining information associated with the phone number from the reverse telephone book database;

comparing the information associated with the phone number obtained from the reverse telephone book database with corresponding information included in the identifying information for the chosen certificate; and if the information associated with the phone number obtained from the reverse telephone book database is not the same as the corresponding information included in the identifying information for the chosen certificate, revoking the chosen certificate.

2. A method as described in claim 1, where the said identifying information includes a name and an address for the owner of the certificate, the method further comprising:

accessing an address database and, using the name included in the identifying information for the owner of the chosen certificate, obtaining an address associated with the owner's name from the address database;

comparing the address associated with the owner's name obtained from the address database with the address for the owner included in the identifying information for the chosen certificate; and if the address associated with the owner's name obtained from the address database is not the same as the address for the owner included in the identifying information for the chosen certificate, revoking the chosen certificate.

3. A method as described in claim 2 where a plurality of reverse telephone book databases or a plurality of address databases are accessed and a predetermined scoring algorithm is used to determine if the chosen certificate is revoked.

4. A method as described in claim 1 where said class is selected on a periodic basis.

5. A method as described in claim 1 where said class is selected on a geographic basis.

6. A method as described in claim 1 where said class is selected on a basis of certificate usage.

7. A method as described in claim 1 where a plurality of reverse telephone book databases are accessed and a predetermined scoring algorithm is used to determine if the chosen certificate is revoked.

8. The method of claim 1, wherein the information associated with the phone number obtained from the reverse telephone book database includes a name.

9. The method of claim 8, wherein the information associated with the phone number obtained from the reverse telephone book database further includes an address.

10. A method for a service provider of a communications network to create and revoke a certificate for a client of the service provider, the method comprising:

receiving a request, via a dedicated communication channel, from the client to create a certificate;

obtaining information identifying the client from an operator of the dedicated communication channel;

in response to obtaining the information identifying the client, creating the requested certificate using the obtained information identifying the client, the certificate including at least an owner's phone number determined from the information identifying the client;

selecting a group of certificates previously created for review;

choosing a certificate from the selected group for review;

accessing a reverse telephone book database and, using the owner's phone number included in the chosen certificate, obtaining information associated with the owner's phone number from the reverse telephone book database comparing the information associated with the phone number obtained from the reverse telephone book database with corresponding information included in the chosen certificate; and if the information associated with the phone number obtained from the reverse telephone book database is not the same as the corresponding information included in the chosen certificate, revoking the chosen certificate.

11. A method as described in claim 10 where the certificate further includes a name and an address for the owner, the method further comprising:

accessing an address database and, using the owner's name included in the chosen certificate, obtaining an address associated with the owner's name from the address database;

comparing the address associated with the owner's name obtained from the address database with the address for the owner included in the chosen certificate; and if the address associated with the owner's name obtained from the address database is not the same as the address for the owner included in the chosen certificate, revoking the chosen certificate.

12. A method as described in claim 11 where a plurality of reverse directories or a plurality of address databases are accessed and a predetermined scoring algorithm is used to determine if the chosen certificate is revoked.

13. A method as described in claim 10 where said class is selected on a periodic basis.

14. A method as described in claim 10 where said class is selected on a geographic basis.

15. A method as described in claim 10 where said class is selected on a basis of certificate usage.

16. A method as described in claim 10 where a plurality of reverse telephone book databases are accessed and a predetermined scoring algorithm is used to determine if the chosen certificate is revoked.

17. The method of claim 10, wherein the information associated with the phone number obtained from the reverse telephone book database includes a name.

18. The method of claim 17, wherein the information associated with the phone number obtained from the reverse telephone book database further includes an address.

19. A programmable server for reviewing and revoking certificates, said server being programmed to:

select a class of certificates for review, each of the certificates including identifying information and a phone number for its owner;

access a certificate database to choose a certificate from the selected class for review;

access a reverse telephone database and, using the phone number included in the chosen certificate, obtaining information associated with the phone number from the reverse telephone book database;

comparing the information associated with the phone number obtained from the reverse telephone book database with corresponding information included in the identifying information for the chosen certificate; and if the information associated with the phone number obtained from the reverse telephone book database is not the same as the corresponding information included in the identifying information for the chosen certificate, revoking the chosen certificate.

20. A server as described in claim 19, where the identifying information includes a name and an address for the owner, and the server is further programmed to:

access an address database and, using the owner's name included in the identifying information for the chosen certificate, obtaining an address associated with the owner's name from the address database;

comparing the address associated with the owner's name obtained from the address database with the address for the owner included in the identifying information for the chosen certificate; and if the address associated with the owner's name obtained from the address database is not the same as the address for the owner included in the identifying information for the chosen certificate, revoking the chosen certificate.

21. A server as described in claim 20, where a plurality of reverse telephone directories or a plurality of address databases are accessed and a predetermined scoring algorithm is used to determine if the chosen certificate is revoked.

22. A server as described in claim 19 where said class is selected on a periodic basis.

23. A server as described in claim 19 where said class is selected on a geographic basis.

24. A server as described in claim 19 where said class is selected on a basis of certificate usage.

25. A server as described in claim 19, where a plurality of reverse telephone book databases are accessed and a predetermined scoring algorithm is used to determine if the chosen certificate is revoked.

26. A server as described in claim 19, wherein the server is further programmed to:

receive, from a requestor, a request, via a dedicated communication channel, for a certificate;

obtain information identifying the requestor from an operator of the dedicated communication channel; and in response to obtaining the information identifying the requestor, create the requested certificate using the obtained information identifying the requestor, the certificate including at least an owner's phone number determined from the information identifying the requestor.

27. A server as described in claim 19, wherein the information associated with the phone number obtained from the reverse telephone book database includes a name.

28. A server as described in claim 27, wherein the information associated with the phone number obtained from the reverse telephone book database further includes an address.

* * * * *